Aug. 30, 1927.  1,641,118
C. E. CARPENTER
DOUGHNUT MACHINE AND THE LIKE
Filed March 6, 1926   5 Sheets-Sheet 1

Inventor.
Charles E. Carpenter.

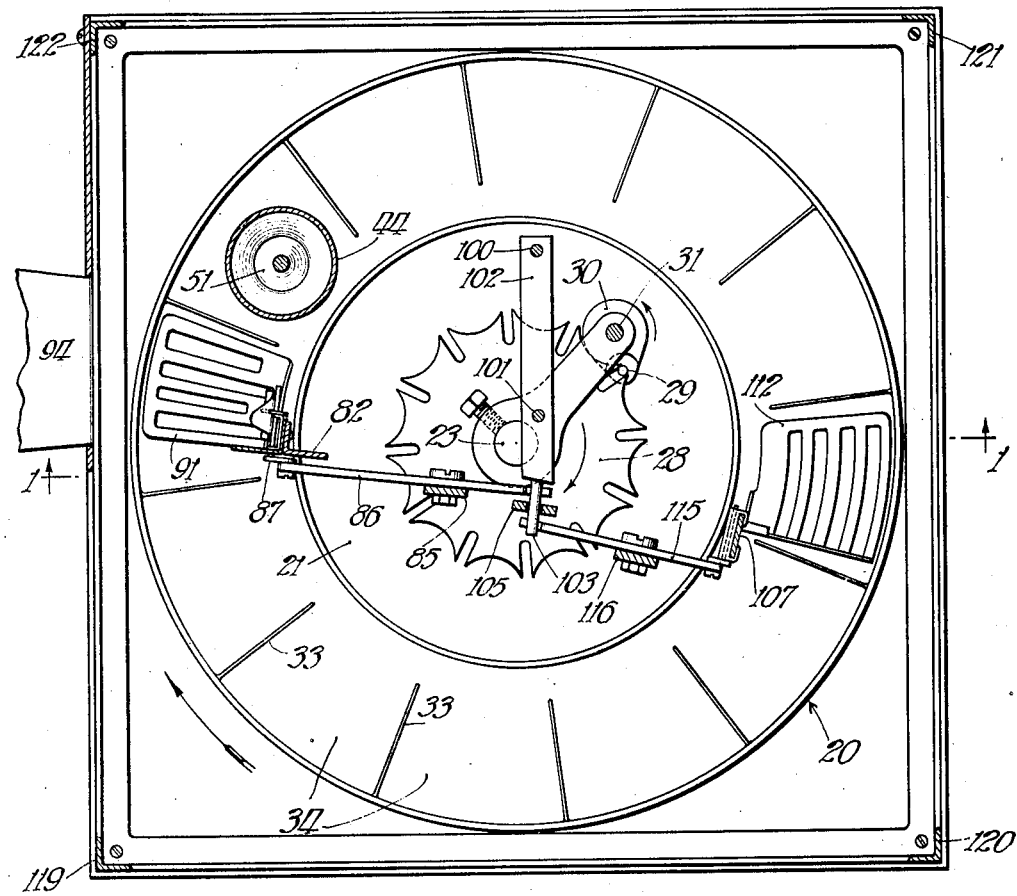

Aug. 30, 1927. 1,641,118
C. E. CARPENTER
DOUGHNUT MACHINE AND THE LIKE
Filed March 6, 1926 5 Sheets-Sheet 3
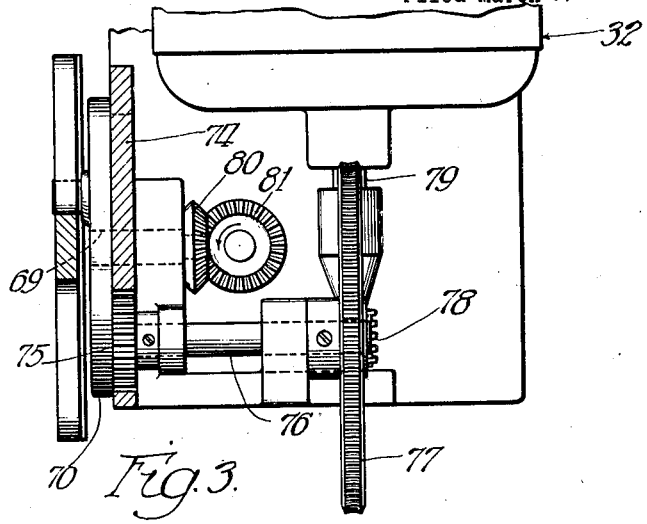
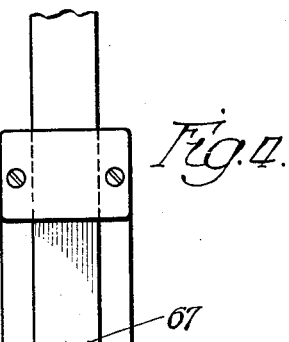
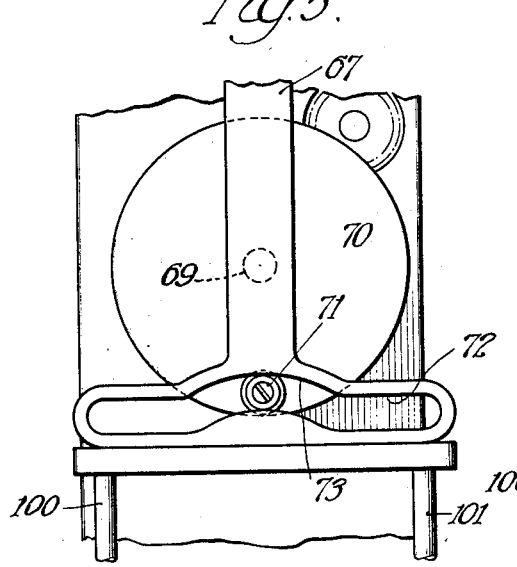
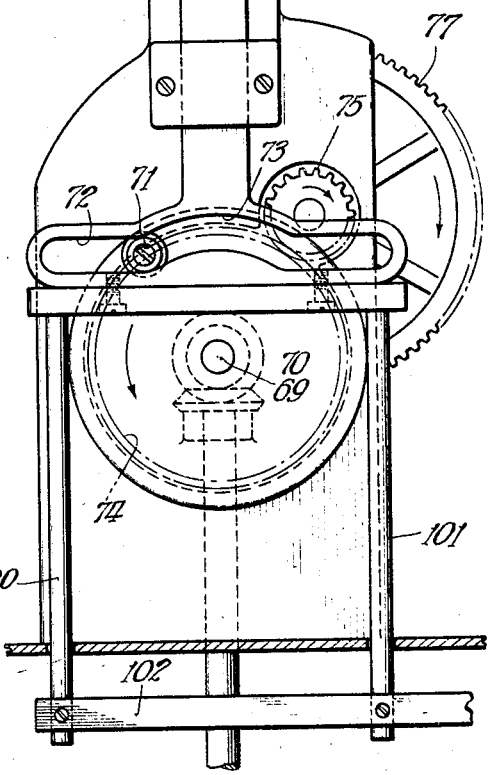
Inventor.
Charles E. Carpenter.

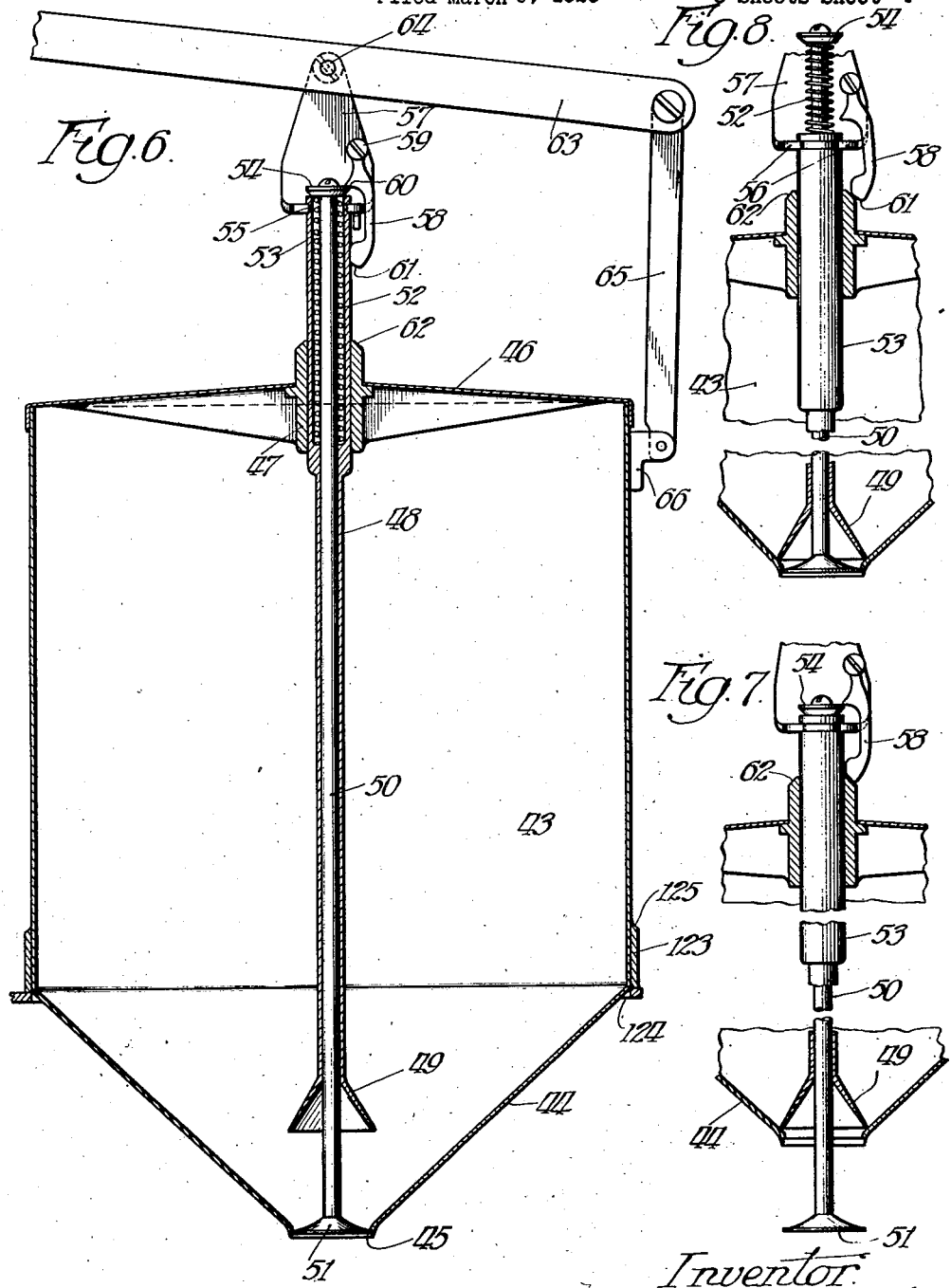

Aug. 30, 1927.
C. E. CARPENTER
1,641,118
DOUGHNUT MACHINE AND THE LIKE
Filed March 6, 1926     5 Sheets-Sheet 5
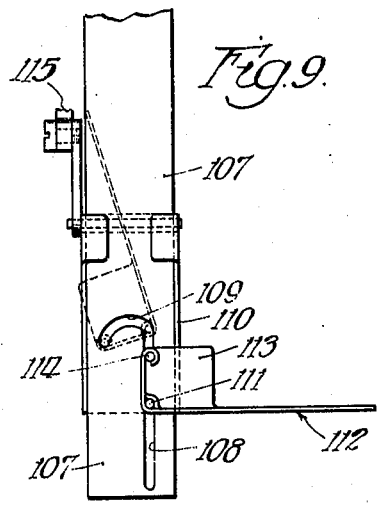
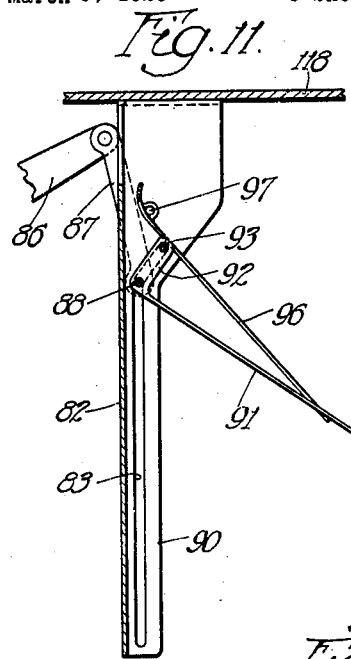
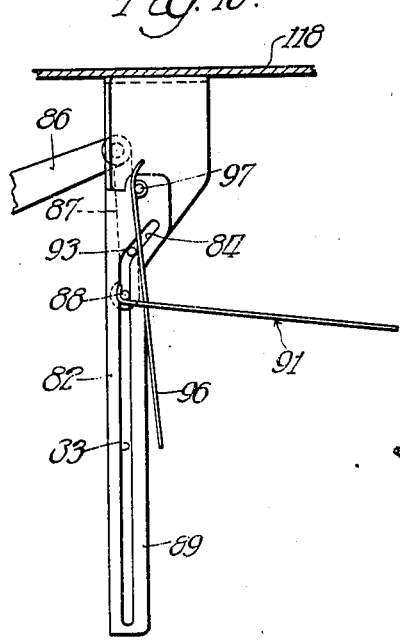
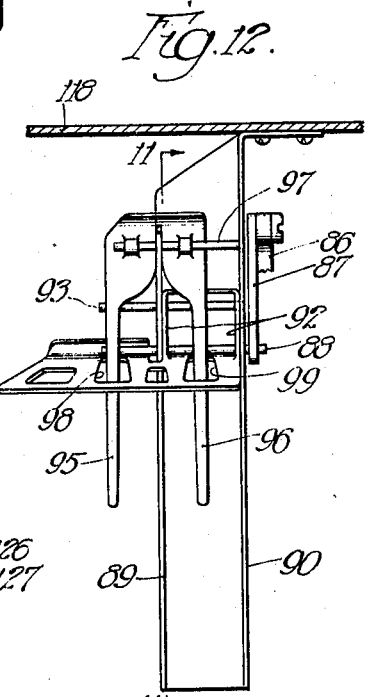
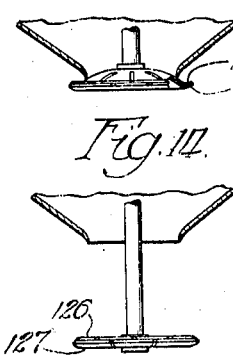
Inventor
Charles E. Carpenter Patented Aug. 30, 1927.

1,641,118

UNITED STATES PATENT OFFICE.

CHARLES E. CARPENTER, OF CHICAGO, ILLINOIS.

DOUGHNUT MACHINE AND THE LIKE.

Application filed March 6, 1926. Serial No. 92,777.

This invention has to do with certain improvements in machines for manufacturing doughnuts and other similar food products which require to be fried or similarly cooked.

One object of the invention is to provide a perfectly automatic machine, which shall function in a continuous and uninterrupted manner as long as the necessary raw materials are supplied to it.

Another object in connection with the above is to provide for the periodical delivery of the dough blanks into the grease, and also to make provision for removing the fried articles from the grease at the proper time.

In connection with the foregoing, it is a further object to provide a new and improved construction of dough vat and dough-feeding mechanism which shall function in such a manner as to invariably ensure the delivery of a correctly formed slice of dough into the grease. In this connection, it is to be understood that the usual form of doughnut has its central portion cut away so that the dough must be delivered into the grease in the form of a ring.

A further feature of the invention relates to the provision of means for turning over the frying doughnuts after they have been fried for approximately one half of the required length of time. This will ensure a uniformly fried and browned product.

A further object of the invention is to make provision for periodically advancing the frying doughnuts by the use of a circular travel, the raw material being delivered into the grease at one point in the circle of travel and the fried doughnuts being removed at the completion, or substantially the completion, of the travel.

In connection with the foregoing, it is a further object to provide a vat in which the doughnuts are fried in a single layer, as distinguished from a bulk frying operation. This will ensure a more perfect and uniformly cooked product.

A further feature of the invention relates to the provision of a new and improved heating element for maintaining the grease bath at the proper temperature at all times. Preferably, this heating element is electrically energized and heated, although manifestly other forms of heaters may be used, such as a gas burner, etc.

Other features of the invention will appear from a detailed description of the same, which consists in the features of construction and combinations of parts hereinafter described and claimed.

In the drawings,—

Fig. 2 shows an irregular horizontal section taken on the line 2—2 of Fig. 1, looking in the direction of the arrows;

Fig. 3 shows a fragmentary horizontal section on the line 3—3 of Fig. 1, looking in the direction of the arrows, but on an enlarged scale;

Fig. 4 shows a fragmentary vertical section on the line 4—4 of Fig. 1, looking in the direction of the arrows, but on an enlarged scale;

Fig. 5 shows a fragmentary side view of a portion of the structure shown in Fig. 4, but with the disk and pin at the bottom of their stroke;

Fig. 6 shows a vertical section through the dough vat, on an enlarged scale as compared to Fig. 1, the operating lever being at the top position and the bottom dough-discharging opening being closed by the poppet valve;

Fig. 7 shows a fragmentary view of the plunger and poppet valve and operating mechanisms at the lowermost position of the stroke, where the wad of dough has been forced down through the opening;

Fig. 8 shows a view similar to that of Fig. 7 with the exception that the latch has been tripped so as to allow the spring to raise the poppet and cut off the wad of dough, at the same time perforating the same;

Fig. 9 shows a fragmentary view of the doughnut turning fingers, which lie in the grease bath and serve to turn over the doughnuts at the proper time; showing the normal position of said fingers by full lines and the reversed position by dotted lines, being on an enlarged scale as compared to Figs. 1 and 2;

Fig. 10 shows a view similar to that of Fig. 9, but illustrating the fingers which serve to discharge the completed doughnut, the same standing in the normal position;

Fig. 11 shows a view similar to that of Fig. 10, but with the parts thrown into the discharging position;

Fig. 12 shows a face view corresponding to Fig. 10;

Figure 1:
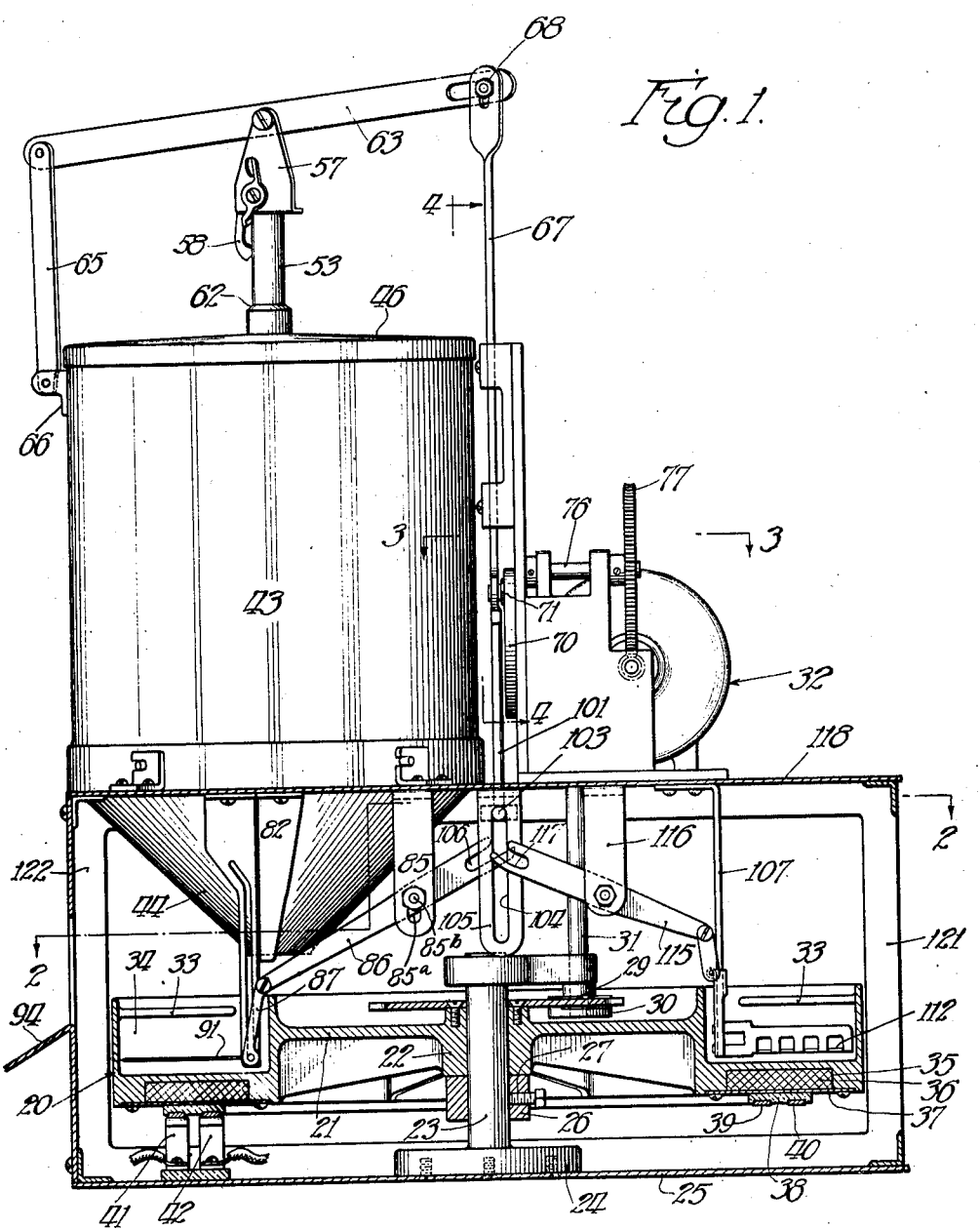
Fig. 1 shows a vertical section through the apparatus, being a section taken on the line 1—1 of Fig. 2, looking in the direction of the arrows.

Fig. 13 shows a fragmentary view of a modified construction of dough-discharging mechanism in the normal position corresponding to Fig. 6, the modification consisting in the use of a poppet of larger size than the opening in the dough vat, said poppet being of spring metal so that it can expand out into the full size when lowered, in order to ensure a larger opening in the doughnut; and Fig. 14 is a view similar to that of Fig. 7, but illustrating the modified type of construction just referred to.

Referring first to Figs. 1 and 2 in particular, I provide a circular cooking pan 20, within which the grease is carried and within which the doughnuts are fried. This pan 20 is supported by a central, horizontal disk or series of arms 21 having a hub 22 mounted upon a central stud 23. The stud itself is provided with a base block 24 secured to a base plate 25, so that the stud does not rotate. The hub 22 rotates on the stud and is supported at the proper position of elevation by a collar 26 secured to the stud in any suitable manner, as by a set screw 27.

The hub and pan are preferably rotated with a step-by-step or intermittent movement. This may be done in any convenient manner, as by means of a star wheel 28 secured to the hub 22, together with a companion pin 29 and disk 30 mounted on the lower end of an operating shaft 31. This operating shaft 31 is driven by suitable gearing from a driving motor 32, preferably mounted above the position of the pan 20.

The pan 20 has a series of radial partitions or fingers 33 which define the cells 34 within which the individual doughnuts are retained. These partitions 33, however, are preferably spaced sufficiently above the floor of the pan 20 to accommodate the turning and discharging fingers presently to be described.

The pan 20 may be heated in any convenient manner, but preferably by an electric heating element. For the latter purpose, the bottom of said pan is provided with an annular recess 35, within which is seated a heating element designated generally by the numeral 36, and held in place by a bottom ring 37. On this ring is placed a ring 38 of insulating material, and on the bottom face thereof are the electric slip rings 39 and 40. Stationary brushes 41 and 42 bear against the slip rings 39 and 40 for the supply of current, as clearly indicated in Fig. 1.

Above the position of the pan 20 there is placed the dough vat 43. The same is preferably cylindrical in form, being provided with a tapered bottom end 44, so that the dough will be more readily delivered to the discharging mechanism. The extreme lower end of the tapered portion 44 is provided with a discharge orifice 45 of proper size. A suitable, removable cover-plate 46 is seated on the top of the cylindrical vat 43, and said cover is provided with a vertical collar 47, within which there is slidably mounted a collar 48. The lower end of this collar 48 terminates in an outwardly flared portion 49 of size substantially the same as the port 45. A rod 50 is slidably mounted within the collar 48, and at its lower end carries a poppet valve 51 of proper size to close the opening 45.

The upper portion of the sleeve 48 is of enlarged size so as to establish an annular space 52 for the accommodation of a helical spring 53. The lower end of this spring bears against the bottom of the annular opening 52, and the upper end of the spring bears against a flange 54 on the top end of the rod 50. This spring, therefore, tends to draw the lower, flared end 49 of the sleeve 48 and the poppet valve 51 of the rod 50 towards each other, as shown in Fig. 8.

At its upper end the sleeve 48 is provided with an annular groove 55 to receive the fingers 56 of a yoke 57, so that by raising and lowering said yoke the sleeve is correspondingly raised or lowered. A latch 58 is pivoted to the yoke 57 at the point 59, said latch having a shoulder 60 which normally engages the top face of the flange 54 to retain the parts locked in the position of Figs. 6 and 7. The lower end of the latch has a cam surface 61 which will engage an upwardly-facing cam surface 62 of the collar 47 when the yoke 57 is forced down to the extreme limit of its movement.

The sequence of operation of these parts is as follows:

When the yoke 57 is raised to the upper extreme limit of movement shown in Fig. 6, the poppet valve 51 seats so as to close the port 45, and the final upward movement of the yoke serves to raise the sleeve 48 until the latch 58 drops over into the position of Fig. 6. This upward movement of the parts also serves to draw a fresh charge of dough beneath the lower, flared end 49 of the sleeve 48, such action being emphasized by the suction created by reason of the bell-shaped or flared form 49.

When the yoke 57 is thereafter forced down, the poppet valve moves down with the sleeve 48, and the charge of dough accumulated beneath the flared end 49 is forced out through the opening 45. This action continues until the latch finally strikes the upper surface 62 of the collar 47, whereupon the latch is tripped and the spring 53 throws the poppet valve suddenly upwards into the position of Fig. 8. This action serves to cut off the protruding mass of dough and at the same time perforates the same so as to establish the hole in the doughnut.

The up and down movements of the yoke 57 may be effected in any convenient manner. For this purpose I have illustrated a cross beam 63 pinned to the yoke at the point 64. One end of said beam is connected by a link 65 with a bracket 66 on the side of the vat 43, and the other end of said beam 63 is connected to the upper end of a vertical pitman 67 by a pin and slot connection 68. By disengaging the pin and slot connection 68 the beam 63 may be raised away from the pitman 67 so as to allow the cover 46 to be raised away from the vat 43. This will at the same time remove the sleeve 48 and the poppet valve from the vat so as to allow the vat to be filled or cleaned conveniently.

The pitman 67 is operated in any convenient manner; but preferably a pin and slot connection, such as shown in Figs. 3, 4 and 5, is used. For this purpose I have provided a horizontal stub shaft 69 carrying a disk 70, on which is a pin 71 having an anti-friction roller. The lower end of the pitman 67 is enlarged laterally so as to establish a substantially horizontal slot 72 within which said pin 71 travels. The rotations of the shaft 69 and disk 70 will thus cause the pitman to rise and fall. It is preferred to secure a dwell at the top end of the pitman stroke, for which purpose the slot 72 has its central portion 73 curved upwardly, as best shown in Figs. 4 and 5, on a curvature the same as the circle in which the pin 71 rotates. As a consequence, when the pin reaches that portion of its upward travel in which it is working within this curved portion 73, the pitman does not rise any farther, but remains stationary until the pin 71 reaches the other side of said curved portion 73. Thereupon the pitman starts to move down, and such movement continues to the bottom of the stroke.

In the above connection it will be noted that the hump on the bottom side of the curved portion 73 of the slot 72 will ensure a momentary acceleration of the downward movement of the piston, so that at the very bottom of its stroke it is given a sudden kick of increased speed.

The stub shaft 69 referred to carries a gear 74, with which meshes a pinion 75 and another stub shaft 76. Said stub shaft 76 in turn carries a worm gear 77 which is driven by a worm 78 on the motor shaft 79 of the motor 32 already referred to. The stub shaft 69 also carries a bevel gear 80 meshing with the bevel gear 81 on the upper end of the shaft 31 already referred to.

Thus the motor serves to drive both the pan and the dough-feeding mechanism.

The port 45 of the dough vat 43 is so positioned that the doughnuts are delivered directly into the pan 20, and the movements of the parts are properly timed so as to ensure delivery of the doughnuts in the consecutive compartments 34 of the pan.

It is desired to make provision for removing the doughnuts after they have been completed, and also to provide for turning over the doughnuts when they are approximately half cooked, so as to ensure an even cooking on both sides. These mechanisms I will now explain in detail.

At a position just in advance of the position of the dough vat 43 there is a downwardly depending bracket 82 which has a vertical slot 83, the upper end of which is turned over at a sharp angle, as shown at 84 in Fig. 10. In this connection it will be observed that Figs. 10 and 11 are views looking in the opposite direction from Fig. 1. Another bracket 85 is provided, to which is pivoted a lever arm 86. The outer end of said lever arm carries a finger 87, the lower end of which has a cross pin 88 working in the slot 83. It is preferred that the bracket 82 be of channel form, as shown particularly in Figs. 11 and 12, so as to establish two flanges 89 and 90, within each of which is formed one of the slots 83 illustrated in Fig. 10. The cross pin 88 extends through both of these slots. It will be noted that the bracket 85 is slotted as shown at 85$^a$ so that the pivot pin 85$^b$ on which the arm 86 is pivoted can be adjusted up and down so as to adjust the elevation of the pivotal point for the arm 86. In this way it is possible to bring the vertical movements of the ejector fingers 91 within the proper upper and lower limits.

A paddle 91 has its inner end journaled on the pin 88, and said paddle is also provided at its back or inner side with an upwardly extending loop 92 which carries at its upper end a cross pin 93. Said cross pin likewise travels in the slots 83. Consequently the paddle 91 is so supported that its position with respect to the horizontal is properly controlled as it travels up and down. When the paddle is at the lower end of its travel it occupies a substantially horizontal position, as shown in Figs. 1 and 10; but as it reaches the upper limit of its movement the cross pin 93 rides over into the angling portion 84 of the slot 83, thus tilting the paddle at a sharp angle, as shown in Fig. 11.

A suitable discharge chute 94 is provided at a position adjacent to the discharge position of the paddle 91, so that after the doughnut has been raised, and when the paddle is tilted, the doughnut will be thrown out on to said chute.

In order to assist in delivering the doughnut, I have provided a pair of light fingers 95 and 96, which are pivoted at their upper ends on a cross pin 97 carried by the bracket 82. These fingers work within suitable slots 98 and 99 of the paddle so as not to interfere with proper movement of the parts. The pin 93 already referred to travels behind the positions of the fingers 95 and 96, so that as said pin reaches its upper limit of movement it throws the fingers forward suddenly, thus lifting the doughnut away from the paddle with an accelerated movement and throwing it on to the chute 94.

Normally the paddle 91 stands at such a lowered position as not to interfere with the lateral movement of the partitions 33 of the pan 20; and at the same time said paddle travels close enough to the floor of the pan to pick up the finished doughnut. These facts will be appreciated from an examination of Fig. 1.

The lever 86 may be operated in any convenient manner, but I prefer to make use of the pitman already referred to. For this purpose the lower end of said pitman, or the horizontal enlargement thereof, carries a pair of downwardly extending rods 100 and 101 which at their lower ends carry a cross piece 102. This cross piece in turn has a sidewise projecting pin 103 working within a vertical guide slot 104 of a bracket 105. The inner end of the lever 86 is slotted, as shown at 106 in Fig. 1 in particular, so that as the pin 103 descends it will pick up the inner end of said lever, rocking the lever and causing the paddle to be properly operated. At the same time the top half of the lever is cut away sufficiently to allow the pin 103 to ride up beyond the position of the lever, as shown in Fig. 1.

The accelerated movement of the pitman at the bottom of its stroke serves to deliver a kick to the paddle 91 and fingers 95 and 96 at the time necessary to ensure the most satisfactory discharge of the doughnut on to the chute 94.

At a position substantially opposite to that of the paddle 91, there is provided a bracket 107 having a vertical slot 108, the upper end of said slot being turned over at substantially one hundred and eighty degrees, as shown at 109 in Fig. 9. A collar 110 slides up and down on the bracket 107, said collar being provided with a pin 111, which reaches through the slot 108 and carries at its inner end a turn-over paddle 112. This turn-over paddle has a vertical projection 113 which carries another pin 114 working in a slot 108 at a position above the pin 111. Consequently, as the collar 110 is raised, the turn-over paddle will be suddenly swung over into the dotted-line position of Fig. 9, by reason of the curved portion 109 of the slot.

The turn-over paddle 112 normally stands at a position close to the floor of the pan 20, as shown in Fig. 1, where it will not interfere with the lateral passage of the partitions 33, and at the same time will pick up the doughnuts at the proper time. As each doughnut is picked up, it is thrown over so as to be turned upside down, thus ensuring a uniform cooking on both sides.

The turn-over paddle may be operated in any convenient manner, preferably by a lever 115 pivoted to a bracket 116. The inner end of said lever 115 is slotted as shown at 117 to receive the same pin 103 which operates the lever 86.

It will be noted that when a doughnut is to be turned over, it is lifted out of one cell of the pan, and is preferably delivered back into the same cell. This result may be ensured by so timing the parts that the pan 20 is advanced the distance of one cell while the paddles 91 and 112 are in the raised position, where they do not interfere with the partitions 33 of the pan. At the same time, this result is readily accomplished by the use of the star wheel or Geneva movement already referred to.

The mechanisms may be housed and supported in any convenient manner, and I do not deem it necessary in this specification to explain the details of such arrangements to any great extent. I will state, however, that it is preferred that the frame of the machine be provided with a table 118 above the base plate 25 and separated therefrom so as to accommodate the pan 20 and the various mechanisms which are immediately associated therewith. This table 118 may in turn be supported by suitable corner posts 119, 120, 121 and 122, as shown in Fig. 2.

It is also preferred that the dough vat 43 be set into a ring 123 surrounding an opening 124 in the table 118, the dough vat being provided with a flange 125 to prevent it from falling through the opening. With this arrangement, it is a relatively simple matter to lift the dough vat away from the table for the purposes of cleaning, etc.

The brackets 82, 85, 105, 107, 116, etc., may be readily supported from the bottom of the table 118.

In Figs. 13 and 14, I have shown a modified construction of poppet valve in place of that illustrated in Figs. 6, 7 and 8. In this modified structure the poppet valve comprises a pair of spring disks 126 and 127, each of which is circular in form, but is radially slotted at a number of points so as to allow it to be flexed about a vertical axis. The central portions of these disks are secured to the stem 50, and the parts are so positioned that as said stem is raised the full amount the disks are drawn up into the port 45, flexing the necessary amount for this purpose. As a result, said valve disks may be made of larger size than the size of the port, so as to ensure the formation of a larger hole in the doughnut than the size of the port through which the dough is delivered.

While I have herein shown and described only certain embodiments of the features of my present invention, still I do not intend to limit myself to the same except as I may do so in the claims.

I claim:

1. In a machine of the class described, the combination of a circular pan mounted for rotation about a vertical axis, means for heating the pan, a stationary dough vat located above the path of travel of said pan, means for periodically delivering dough batches from the vat into the pan, means depending into the pan adapted to receive the completed doughnuts, means for periodically raising said receiving means and for actuating said receiving means to discharge the doughnuts received thereon, means located at a position substantially opposite to said receiving and discharging means also depending into the pan to receive the cooking doughnuts thereon, means for raising and turning said last mentioned receiving means to turn the doughnuts thereon, and means for causing all of said parts to function in sequence, substantially as described.

2. In a machine of the class described, the combination of a circular pan mounted for rotation about a vertical axis, means for heating the pan, means for introducing ring-shaped dough batches into the pan at one point in its circular path of travel, means for turning said ring-shaped dough batches at another point in the circular path of travel substantially opposite to the point of introduction, and means for raising the completed dough batches from the pan at another point in the circular path of travel and immediately in advance of the point of introduction, substantially as described.

3. In a machine of the class described, the combination of a cooking vessel, means for causing said vessel to travel in a definite closed path lying in a substantially horizontal plane, a series of compartments in said vessel corresponding to individual articles to be cooked therein, means for heating the vessel during its travel, means for intermittently introducing dough batches into the consecutive compartments as they pass a given point, means for turning the cooking articles in the different compartments as they pass another point, and means for removing the cooked articles from the individual compartments as they pass another point, substantially as described.

4. In a machine of the class described the combination of a circular pan, means for rotating the same in a horizontal plane, means for heating said pan, means for introducing dough batches into the pan at a given point, and means for ejecting the cooked articles from the pan comprising a stationary downwardly depending bracket reaching to a point within the pan, there being a vertical slot in said bracket reaching to a point close to the lower end thereof, the upper end of said slot curving outwardly, a vertically movable tray having a pair of guide pins working in said slot, said guide pins serving to retain the tray in substantially horizontal position during travel of said pins through the vertical portion of the slot, and serving to cause the tray to tilt downwardly when the pins enter the upper end of the slot, to thereby allow the supported article to slide off of the tray, there being a plurality of slots in the tray, a sweep member pivoted to a stationary part above the path of travel of the tray and having fingers depending in said slots, the upper guide pin of the tray serving to engage said fingers to swing them outwardly when the tray reaches the upper end of its travel to thereby assist in ejecting the article from the tray sideways, substantially as described.

5. In a machine of the class described the combination of a circular pan, means for rotating the same in a horizontal plane, means for heating said pan, means for introducing dough batches into the pan at a given point, and means for ejecting the cooked articles from the pan comprising a stationary downwardly depending bracket reaching to a point within the pan, a vertically movable tray traveling adjacent to said bracket, means for supporting said tray in a substantially horizontal plane during its vertical movements, means for tilting said tray adjacent to the upper limit of its movements to thereby allow the supported article to slide off of the tray, a sweep member pivotally mounted adjacent to the tray, and means for causing the same to sweep outwardly with respect to the tray co-incidentally with the tilting action of the tray substantially as described.

6. In a machine of the class described, the combination of a pan, means for heating the same, means for introducing dough batches into the pan at a given point, and means for ejecting the cooked articles from the pan, comprising a downwardly depending bracket reaching to a point close to the floor of the pan, a vertically movable tray working in conjunction with said bracket, means for sustaining the tray in substantially horizontal position during its vertical travel, means for causing the tray to tilt downwardly at a point adjacent to the upper limit of its travel, to thereby permit the supported article to slide off of the tray, together with means for sweeping the articles from the tray comprising a sweep member pivoted at a point above the tray and having a series of downwardly depending fingers working adjacent to the tray, and means for causing said fingers to sweep across the tray co-incidentally with the tilting of the tray, substantially as described.

7. In a machine of the class described an elevating and ejecting device comprising a vertically movable tray, means for sustaining the same in substantially horizontal position during its vertical travel, means for causing said tray to tilt downwardly at a point adjacent to the upper limit of its travel, and a sweep member pivoted at a position above the tray and including a plurality of downwardly depending fingers adapted to sweep across the tray co-incidentally with the downward tilting of the tray, substantially as described.

8. A machine of the class described comprising in combination a circular pan for cooking grease, means for supporting the same to permit rotation within a horizontal plane, means for introducing dough batches into said pan at a given point in its rotary travel, said batches floating on the surface of the hot grease therein, together with means for turning over the cooking articles at a selected point in the rotation of the pan, said turning means comprising a downwardly depending bracket reaching to a point close to the floor of the pan, a vertical slide working on said bracket, a horizontal tray pivoted to said slide, means for retaining said tray in horizontal position during the vertical movements of the slide, and means for turning said tray through an arc substantially greater than 90° when the slide reaches a point adjacent to the upper limit of its travel on the bracket, substantially as described.

9. In a machine of the class described, the combination of a circular pan for grease or the like having a series of radial partitions reaching partially across the pan but substantially separated from the floor of the pan, means for heating the pan, means for rotating the pan in a horizontal plane, means for introducing dough batches into the pan at one point in its rotary travel and means for turning said dough batches at another point in its travel comprising a downwardly depending bracket reaching into the pan, at a radial position intermediate between the partitions and the edge of the pan, a carriage vertically movable upon the said bracket, a tray pivotally mounted upon said carriage, and adapted to rotate about a radially extending axis, means for supporting said tray in substantially horizontal position during the vertical movements of the carriage on the bracket, the tray normally standing at a position within the pan lower than the partitions aforesaid, whereby the partitions travel above the tray, and means for swinging the tray on its axis when the carriage is raised substantially to its upper extreme limit of movement, to thereby cause the tray to rotate forwardly with respect to the direction of travel of the pan, substantially as described.

10. In a machine of the class described, the combination of a pan for grease or the like mounted for movement in a given direction of travel, there being a series of partitions extending partially across the width of said pan and spaced above the floor thereof to establish a series of compartments for individual articles being cooked, means for heating the pan, means for introducing dough batches into the compartments aforesaid at one point in the path of travel, and means for turning said dough batches at another point in the path of travel comprising a downwardly depending bracket reaching into the pan at a position intermediate between the partitions and the edge of the pan, a carriage vertically movable upon said bracket, a tray pivotally mounted on said carriage and adapted to rotate about an axis extending at right angles to the path of travel of the pan, means for supporting said tray in a substantially horizontal position during the vertical movements of the carriage on the bracket, the tray normally standing at a position within the pan lower than the partitions aforesaid, whereby the partitions travel above the tray, and means for swinging the tray on its axis when the carriage is raised substantially to its extreme limit of movement, to thereby cause the tray to rotate forwardly with respect to the direction of travel of the pan, substantially as described.

11. In a machine of the class described the combination of a circular, relatively shallow pan for grease, means for supporting said pan to permit the same to rotate about a central vertical axis, a series of radial partitions extending at least part way across the pan to establish a series of individual compartments, therein, together with means for heating the pan comprising an electric heating element in contact with the bottom surface of the pan beneath the compartments aforesaid, together with means for supplying current to the heating element during the rotation of the pan, substantially as described.

12. In a machine of the class described the combination of a circular relatively shallow pan for grease or the like, means for supporting said pan in a substantially horizontal position to permit rotation of the pan about a circular vertical axis, there being a circular upwardly reaching channel in the bottom face of the pan for the accommodation of a heating element, an electric heating element inserted therein and in contact with the bottom surface of the pan, and traveling with the pan, and serving to heat the pan from beneath, means for enclosing the bottom of said channel to retain the heating element therein, and means for supplying current to said heating element, substantially as described.

13. In a device of the class described the combination of a circular relatively shallow pan for grease or the like, means for supporting the same in a substantially horizontal position, means for moving said pan through a definite path of travel, there being an upwardly facing channel in the bottom of the pan for the accommodation of a heating element, an electric heating element in said channel and directly heating the bottom face of the pan, together with means for supplying electric current to said heating element during travel of the pan, substantially as described.

14. In a mechanism of the class described the combination of a circular pan, means for supporting the same to permit rotation about a central vertical axis, means for heating the pan during rotation, means for advancing the pan with a step by step rotary motion, means for introducing dough batches into the pan at one point in its path of travel, a turning tray in conjunction with the pan at another point in its path of travel and including means permitting said turning tray to be reciprocated vertically with forward rotation at the upper limit of its reciprocation, a discharge tray in conjunction with the pan at another point in its path of travel and including means permitting vertical reciprocation of said tray with means for tilting the tray outwardly at its upper limit of reciprocation, common means for reciprocating both of the trays aforesaid simultaneously, and an operative connection between said common reciprocating means and the pan advancing means substantially as described.

15. In a machine of the class described the combination of a circular pan for grease, means for supporting the same to permit rotation about a central vertical axis, a series of radial partitions in the pan serving to establish a series of individual compartments therein, means for heating the pan during rotation, means for feeding dough batches into the individual compartments, and means for advancing the pan step by step the distance of one compartment at each advancement, said advancing means comprising a star wheel in conjunction with the pan and having a number of operating positions equal to the number of compartments, together with a pin for operating said star wheel substantially as described.

CHARLES E. CARPENTER.